United States Patent
Edwards

(10) Patent No.: US 10,417,204 B2
(45) Date of Patent: Sep. 17, 2019

(54) METHOD AND SYSTEM FOR CREATION AND DELIVERY OF DYNAMIC COMMUNICATIONS

(71) Applicant: Stephen Edwards, McLean, VA (US)

(72) Inventor: Stephen Edwards, McLean, VA (US)

(73) Assignee: VERBOSITY LLC, Vienna, VA (US)

( * ) Notice: Subject to any disclaimer, the term of this patent is extended or adjusted under 35 U.S.C. 154(b) by 255 days.

(21) Appl. No.: 15/067,804

(22) Filed: Mar. 11, 2016

(65) Prior Publication Data

US 2016/0299925 A1 Oct. 13, 2016

Related U.S. Application Data

(60) Provisional application No. 62/132,266, filed on Mar. 12, 2015.

(51) Int. Cl.
*G06F 16/22* (2019.01)
*G06F 9/54* (2006.01)
*G06F 17/24* (2006.01)

(52) U.S. Cl.
CPC ............ *G06F 16/22* (2019.01); *G06F 9/543* (2013.01); *G06F 17/248* (2013.01)

(58) Field of Classification Search
CPC ..................................................... G06F 16/22
See application file for complete search history.

(56) References Cited

U.S. PATENT DOCUMENTS

| 5,835,712 | A | * | 11/1998 | DuFresne | ........... G06F 21/6227 |
| | | | | | 709/203 |
| 6,047,327 | A | * | 4/2000 | Tso | ..................... G06F 16/9537 |
| | | | | | 709/232 |
| 2004/0111424 | A1 | * | 6/2004 | Roman | ................. G06F 16/958 |
| 2007/0111424 | A1 | | 5/2007 | Suzawa et al. | |
| 2007/0282874 | A1 | | 12/2007 | Metcalfe | |

FOREIGN PATENT DOCUMENTS

WO 200219153 A1 3/2002

OTHER PUBLICATIONS

International Search Report for PCT/US2016/022054 dated Jun. 2, 2016.

* cited by examiner

*Primary Examiner* — Van H Oberly
(74) *Attorney, Agent, or Firm* — Hogan Lovells US LLP

(57) ABSTRACT

A method and system allow for creation and delivery of dynamic communications. The method and system implement software applications allowing content authors to generate dynamic data and scripts. In addition, other software applications allow users to request the generation of dynamic data. These requests are transmitted to a server application, which generates content based on the request sent by users, as well as the dynamic data and scripts stored by content authors. The generated content is then supplied to the user application for display, printing, or other use by the user.

18 Claims, 19 Drawing Sheets

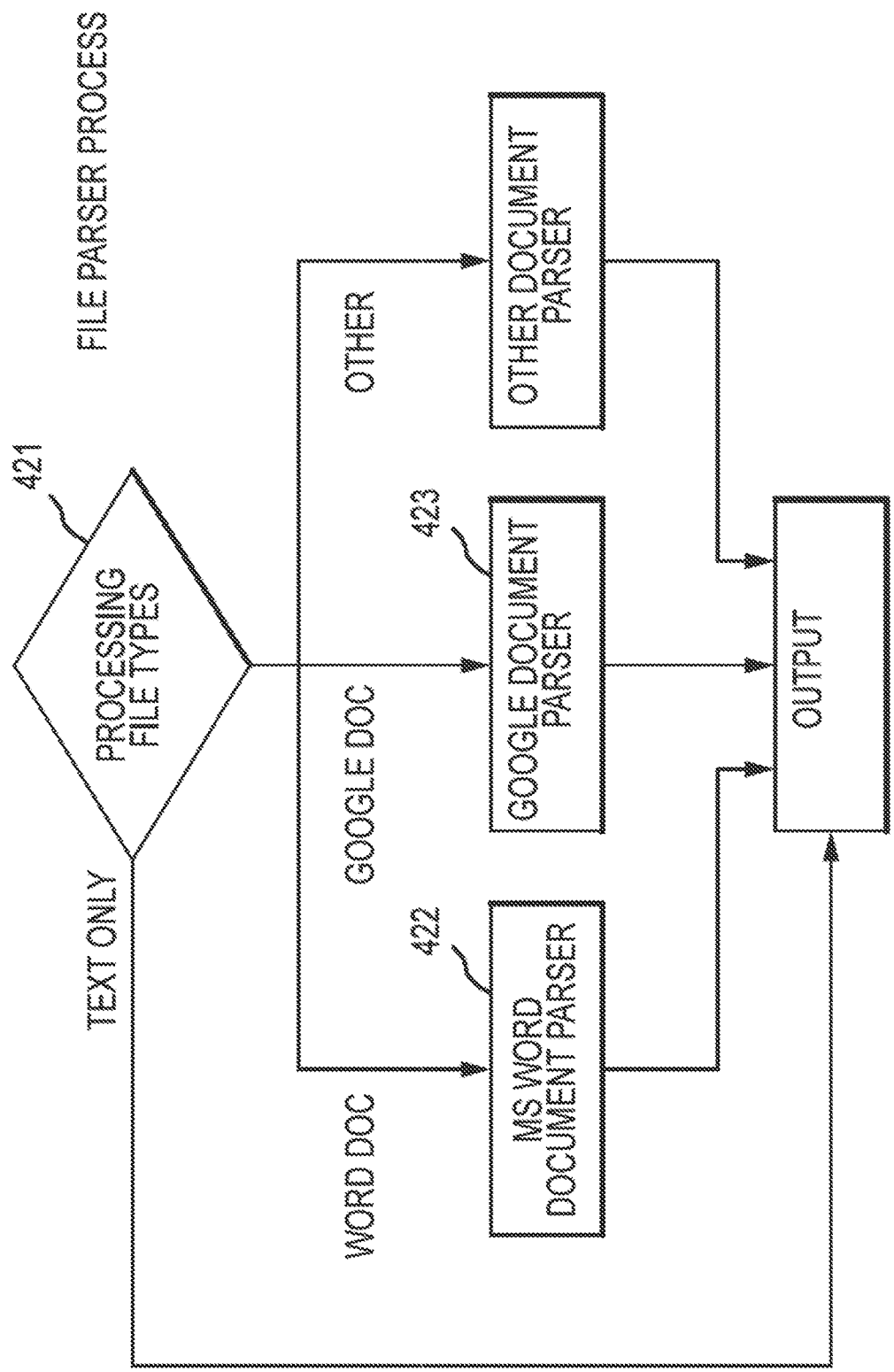

FIG.9A

(OBJECT (ACTORS, FORMULAS, AND RULES) MANAGER

ACTORS ▾ RULES ▾ FORMULAS ▾

NAME (KEY): STORE

ACTOR TYPE: [ ▾ ] INT.  [+] [▣] [X]

| PROPERTY NAME | DATA TYPE | INIT/VALUE |
|---|---|---|
| CITY | TEXT | ▾ ARLINGTON ☒ |
| PURPOSE | TEXT | ☒ |
| SLOGAN | TEXT | ☒ |
| PRODUCTS | TEXT | SYSTEM COLLECTIONS ☒ |
| WEBADDRESS | TEXT | WWW.NATASHAGARM ☒ |
| STREET | TEXT | FRANKLIN TERRACE ☒ |

901

| NAME | TYPE | VALUE |
|---|---|---|
| LOCATION | TEXT | FALL ST. IN RICHMOND |
| TITLE | TEXT | MS. |
| HAIRCOLOR | TEXT | DYED(OTHER) |
| GENDER | TEXT | FEMALE |
| CITY | TEXT | RICHMOND |

902

900

□ ADLIBBER PLUS 1.0

| CREATE | CHOPPER | ACTOR DATA | SMARTEXT RULES | CLIPBOARD | FUNCTIONS (MATH) |

□ ⊠ | DETAIL ˅ | OUTPUT ˅ | CHOP INTO: | PLAIN TEXT PIECES ˅ | CHOP TEXT | INSERT | ˄

LEVEL:            ED LIKE "MOCK" THINK TANKS AND LEARNED BUSINESS STRATEGIES
WILL B  LOW (PARAGRAPHS)  PROBLEMS INCREASES THE CREATIVITY OF GETTING THE RESULTS
DESIRE  MEDIUM (SENTENCES)  ANTS ALLOWING THEM TO SEE THE POTENTIAL WITHIN THEMSELVES
    ☑ HIGH (WORDS)
TO NOT ONLY BECOME MEMBERS OF THE COMMUNITY BUT ALSO TO MANAGE, OPERATE AND OWN A
BUSINESS OR START A NON-PROFIT IN THE FUTURE.

— 920

COMPILED SCRIPT - 6 PIECES WITH 6,220,800 POSSIBLE VARIATIONS    ▫ ▫ ˅ ⊠

A FEW WEEKS AGO ONE NICE NIGHT IN AUGUST, NATALIE TOLIVER STOPPED OFF AT NATASHA'S GARMENTS
INCORPORATED, A GARMENTS STORE AT THE END OF FRANKLIN TERRACE.

METHOD AND SYSTEM FOR CREATION AND DELIVERY OF DYNAMIC COMMUNICATIONS

CROSS-REFERENCE TO RELATED APPLICATIONS

This application claims priority to U.S. Provisional Application No. 62/132,266, filed Mar. 12, 2015, the contents of which are incorporated herein in their entirety.

TECHNICAL FIELD

The present application is directed to computer program products, methods, and systems for allowing users to generate dynamic content, such as text or reports, based on the application of customizable logic rules to data from any source. In particular, the application is directed to allowing users to create complex logic rules and scripts containing those rules, and to dynamically apply the scripts and rules to data. The rules, when applied to data, dynamically generate content.

BACKGROUND OF THE INVENTION

Currently, the generation of dynamic content relies on either simplistic static replacement of fields with text, like the mail merge function in popular word processing programs, or on resource-intensive natural language processing using complex artificial intelligence.

Field-based static text replacement is limited in terms of the depth of its output. Lacking any ability to parse logical rules, this product is limited to simple replacement of "fields" (representing locations where data should be inserted) in a text template with text or numeric data values stored in a database. For example, this field-based static replacement product could replace the template phrase "[First Name] likes to run with [Best Friend]" with the auto generated phrases "Alice likes to run with Bob" and "Charlie likes to run with Dave." Static text replacement could not, however, alter this template based on variations in the data to which it is applied. This forces a one-size-fits-all solution to dynamic text generation. In the above example, assume the user instead created the template phrase "[First Name] likes to run with [Friend 1] and [Friend 2]." If static text replacement applied this template to a data record stating "First Name=Alice, Friend 1=Bob, Friend 2=Earl," the product would create the phrase "Alice likes to run with Bob and Earl." But if the same template applied to a data record stating "First Name=Charlie, Friend 1=Dave," where the Friend 2 data field was empty (perhaps because Charlie only liked to run with one friend), the product would then generate the grammatically-incorrect "Charlie likes to run with Dave and."

Natural language processing using artificial intelligence avoids the limitations of static text and allows dynamic generation of more complex text and other communications. Using natural language processing, a system can dynamically generate text based on grammatical or statistical models of language in a particular domain. These models, however, require a high-level of operational skill to create, and are domain-specific (i.e., a product that allows the dynamic generation of form letters to finance customers is unhelpful when generating medical reports). End-users who find that a natural language product does not adequately support their given domain of expertise must seek out computer science professionals to build the appropriate models for their field, which can become costly and impractical.

There is still a need to dynamically generate text content, and to customize the content of that text based on the data being used to generate it, in order to provide a system that allows content authors to personalize content designed for distribution to a variety of end users. What is needed is a system and method providing a scalable technology to allow a broader group of users to be able to script the automated generation of dynamic text.

SUMMARY OF THE INVENTION

The present application is directed to systems, computer program products, and methods for allowing users to generate dynamic content, such as text or reports, based on the application of nestable, easily customized, easily organized, and easily edited logic rules to data objects. The data objects may also be easily nested, customized and edited. The system and method enable content authors to create and edit logic rules, such as Boolean rules. These rules are incorporated into scripts. The system generates dynamic communications by applying scripts to stored data. Unlike static text replacement, these logic rules can adjust output based on characteristics of data. Unlike natural language systems, these rules are user-editable and do not require extensive training or experience to create or edit. This system can facilitate automated analysis and reporting, dynamic advertising, expert services, code generation, and other text-based applications as well as allow end-user customization of the rules used to dynamically generate content based on data.

The system includes multiple applications executed as computer readable instructions by processors within one or more computing devices in communication with each other. The computer readable instructions may be stored on any computer readable media for containing code, or portions of code, and can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system processor. The communication between computing devices may be performed by wired or wireless connections, including connections over a network, such as the global Internet network. One or more user devices, operated by end users, may have operator input, such as a keypad, touchscreen, or mouse, allowing an operator to input requests for dynamic content generation. These requests are then transmitted over the network. These requests may include an indication of the type of content request, particular data to be included, particular databases to be searched, attached files to be used, or instructions to a receiving computing device. These requests are received at server computing devices, which execute a validation program that verifies end users' requests to the databases.

A parser program in the server computing devices applies dynamic scripts to dynamic data to generate a text result.

These servers may contain databases storing dynamic scripts as well as dynamic data objects. The dynamic scripts include one or more logic rules that identify one or more data properties, one or more conditions for each property, and whether the condition is true or false for a given data record. The data objects are object representations of structured data critical to the output, and may contain functions or formulas that can dynamically generate structured data. Object representations may contain references to rules. The object representations may also be container objects—objects that are collections of other objects. Finally, object representations may store text or other static data. This data structure allows for nested storage of data objects. Each object may reference one or more logic rules, and each object may further reference other data objects referencing the same or different logic rules. This allows the generation of dynamic text or other content with complex variations depending on the evaluation of the logic rules after applying the rules to the content of data objects.

The system also comprises one or more client computing devices running one or more computer program products. The computer program products residing on the client computing device may implement application programming interfaces ("API") that allow end users to submit requests to receive generated dynamic content from the server. The end user may also submit requests to edit content stored within the server databases. These programs may allow content creators to create new content or to edit content after retrieval from a server database via a user interface. These programs may allow content creators to submit requests to store new edited content within a database to a computing device capable of writing to that database. Finally, these programs may allow end users to view dynamically generated content, and may allow users to input responses to questions posed by that content via a user interface. These responses may then be communicated to an application running on a computing device which will then generate additional content based on those responses and transmit that additional content to the client computing device.

The dynamic data and scripts within the database(s) are modified by means of an API allowing content creators using computer programs on a client computing device to edit these items. Editor programs use this API and allow content authors to create, manage, and edit logic rules. Editor programs also allow content creators to select pieces of text or data to which these logic rules are applied. Because data can itself contain references to rules, this allows users to create nested rules. For example, a rule that modifies text based on a person's recorded residence status in the Washington, D.C., area can itself be modified by a rule that modifies text based on a person's recorded gender. This rule set with two nested rules therefore allows four possible text outputs based on stored data values. As more nested rules are added, output complexity increases exponentially allowing customized text with minimal cost to a content author.

An editor program may allow editing of rules, including embedding rules within other rules directly within an editor to allow simplified manipulation of nested rule statements. Rules may be also combined via well-known logical constructs, such as "and," "or," or "xor" statements, to allow an editor to determine when a particular combination of rules should execute. For example, a set of rules for generating a form email to amusement park patrons could send an email describing an indoor meet-and-greet with comic book characters when both weather conditions are poor and crowd levels at the meet-and-greet are low. A nested rule that determines that weather conditions are poor could make that determination based on, for example, two temperature rules connected by an "or" statement (e.g., Temperature>90° OR Temperature<50°).

Editor programs also allow content authors to manipulate stored dynamic data using the database API. This manipulation may be accomplished in several ways. The data may be created or modified by manual data entry, or authors may use programs to automatically generate data, or to input data from external sources using popular data formats. Authors may also use programs to input formulas or mathematical functions to automatically generate new content based on preexisting content in the database, and may use programs to dynamically transform inputted text to allow the generation of random variations within the text for each word, sentence, paragraph, or other grouping of text. Since the ability exists for the value of data objects to be dynamically manipulated as defined by the author, rules and expressions can be used to allow the parser to determine whether to continue at its current position, jump to another point in the script and proceed, or exit the parsing process altogether and return the output. This ability to allow for condition-based multi-directional parsing provides opportunities for deeply sophisticated communication.

End-user requests to access dynamically-generated content are made by means of an API that sends requests from client computer programs used by end-users to a database stored on a server computing device. End user requests are then validated by means of a computer program running on the server storing the database. Validated requests are processed by a computer program parsing a dynamic script with data stored in the server side database. The parser then returns dynamically generated output to the end user program. Additionally, end user requests could result in the generation of a series of questions for the end user. Answers provided by the end user are then used as input by the server side parser program to dynamically generate output based on content authors' inputs.

BRIEF DESCRIPTION OF THE DRAWINGS

FIG. 4C is a flowchart describing the process of how an imported document is converted into text.

FIG. 9A illustrates an example of a user interface allowing a content creator to view and manipulate data objects that, when parsed according to logic rules, form the building blocks of dynamically generated content.

FIG. 9C illustrates an example of a user interface allowing a content creator to generate data objects for words, sentences, or paragraphs based on plain text input.

DETAILED DESCRIPTION OF THE INVENTION

A system and method for allowing users to request and view dynamically generated content based on logic rules developed by content creators. The system and method further includes an application that is executed as computer readable instructions by a processor within any computing device.

Figure 1:
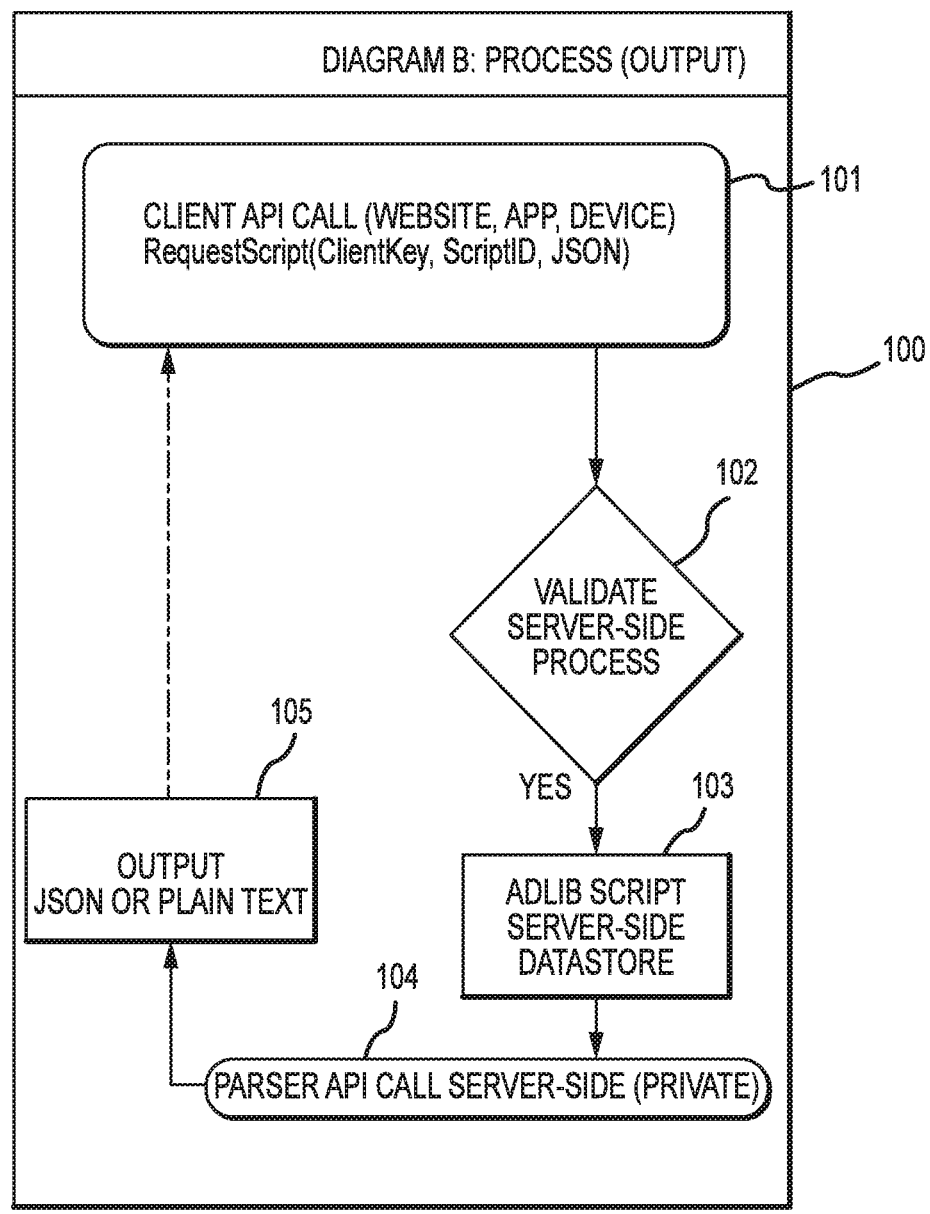
FIG. 1 is an illustration of the process of a user client requesting dynamically generated content from a server side data store.

FIG. 1 illustrates the process by which the system and method serve dynamic content to users 100. An application 101 ("client application"), residing on a user's computing device, which may be a laptop, desktop, smartphone, cellular phone, tablet, or other device capable of accessing a computer network, issues a request for content with a private key resident in the application 101. A validation application residing on a computing device 103, which may be a different computing device such as a server, or may be the same device as the device running the client application, receives this request and validates it using a public key provided by the client application to confirm an authorized client is making the request 102. Script data comprising logic rules and customized expressions is then accessed from a database by the computing device 103. The access may be in the form of a PHP interface accessing a relational or nonrelational database, for example a MySQL or a NoSQL database. Another application that may reside on the same computing device as the validation application, the parser, takes as input this script data, the user's request, and other stored dynamic data 104.

This dynamic data may include data structures such as Actor objects, FX objects, or Comp objects. Comp objects may be PlainText Comp objects, SmartText Comp objects, Actor Comp objects, Group Comp Objects, or FX Comp objects. PlainText Comp objects contain static data, which may include images, tables, links, or plain text. SmartText Comps include one or more objects called iPXs (or Inner Paths), each of which may contain one or more other comps, including other SmartText Comps. Each iPX may directly reference a logical rule (which can contain one rule or a composite of multiple rules and expressions in the form of FXs), which is used to determine which comp contained within the iPX will be used in output. Alternatively, a SmartText Comp can be set to randomly choose which iPX to select as a path or a combination of rule-based iPX selection and Random selection (on all remaining iPXs, if all rules fail). In terms of parsing, iPX selection is based first on which rule evaluates to TRUE, and if all rules should evaluate FALSE, then a random selection will be made of any remaining iPXs not assigned a rule. A specialized SmartText Comp can also be used to force the parser to evaluate whether or not to continue parsing from the current position, move to a new position within the script to continue parsing, or to exit the parsing process and return the output. In this specialized Comp, each iPX Comps is given an action to take if, in the case rule-based iPXs, its rule evaluates to TRUE, or if random, it is happens to be selected. Actor Comp objects are objects that store references to data stored within a database, and facilitate a link to the data store. Group Comp objects are specialized containers holding one or more Comp objects, and are designed to work specifically with the properties of Actor Comps when the Actor Comp itself contains an array of related elements storing data references. FX Comps are Actor Comps that contain custom functions or formulas that act on the data reference stored within the Comp to generate preprocessed data to be included in fields of an Actor or Comp for output. The parser application applies the dynamic scripts to the data and user input and generates output 105.

This output is then returned to the requesting client application 101. For example, a client application may be a commercial software application that provides mathematical word problems to a student in grade school. This application, when a student requests a new problem to complete, sends a request to a server to dynamically generate a new problem. The server validates the request. A parser application applies a script to data contained within a database and generates a word problem that may contain variations including the numbers, names of persons, or other text contained within the word problem. The parser application generates these variations based on FX Comp data objects containing mathematical functions, as well as Comp objects containing static text phrases and numeric data created by the content author. The parser application returns this generated word problem to the grade school user's client application, and the word problem is displayed on the user device screen or printed.

Figure 2:
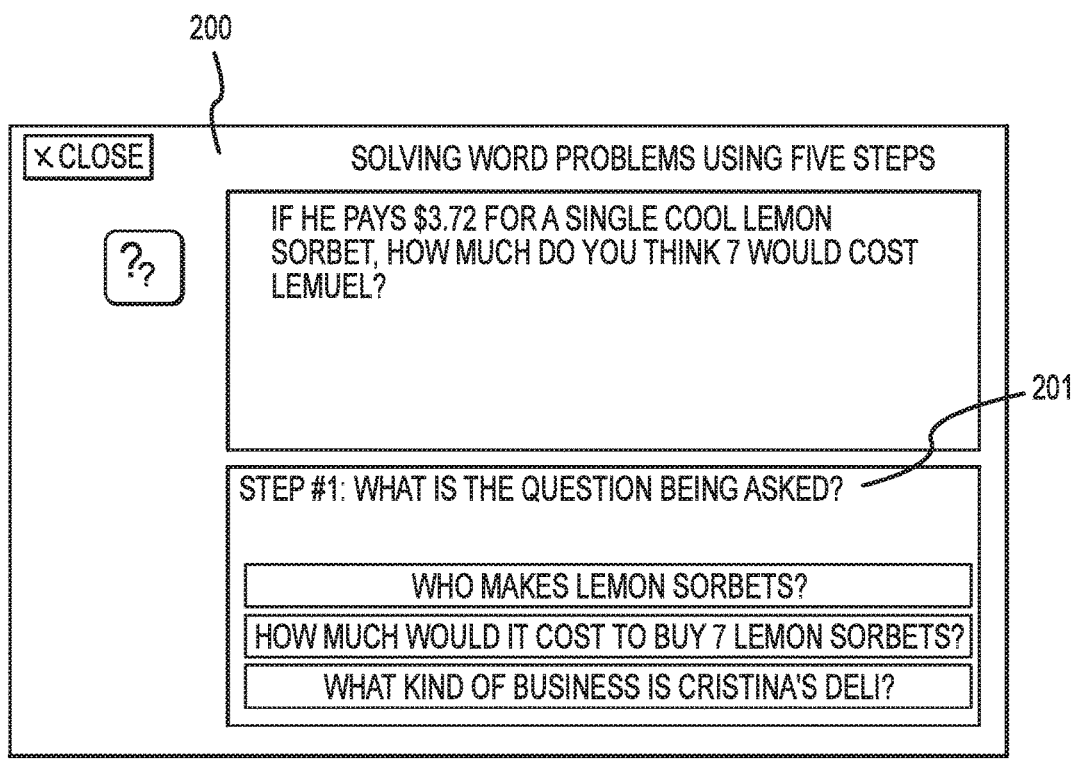
FIG. 2 illustrates an example of a user interface of a software application allowing a user to view dynamically generated text content.

As shown in FIG. 2, dynamic content may be displayed to a user through an application running on the user device 200. This content may optionally include additional questions posed to the user for the purpose of generating further content 201. For example, a survey questionnaire program may operate on a user device, for example as an application within a web browser. This questionnaire program sends a request to a server when a user indicates he wishes to begin the survey. The server validates the request. A parser application applies a script to data contained within a database and generates a series of survey questions to the user. The parser application returns these questions to the survey user's client application, and the questions are displayed on the user device screen. The user may submit answers to the questions by means of a user interface within the survey application. These answers may then be sent as a request to a server, which may then generate additional questions or other content based on the answers to the questions and other data, and return the additional questions or other content to the user. For example, an author may wish to provide an application that teaches grade school students to solve mathematical word problems. As shown in FIG. 2, the user application could generate a word problem and a plurality of selectable answers to select from. The word problem in this example contains an autogenerated question: "If he pays $3.72 for a single cool lemon sorbet, how much do you think 7 would cost Lemuel?" The word problem in this example also contains one autogenerated question that is a synonym of the above question—"How much would it cost to buy 7 lemon sorbets?"—as well as four autogenerated questions that are not synonyms of that question. In this example, if a user selects the correct question, the program will proceed to ask the user a different question about the word problem, and display new answer choices based on that question. If the user selects the wrong question, the program will automatically generate one new synonymous question and four incorrect answers based on the data objects used to generate the original problem, and display these new choices to the user. The user application 200 can be configured to display dynamic content of any type. Alternatively, user application 200 may be optimized to display dynamic content in a single field, for example, financial reports.

Figure 3:
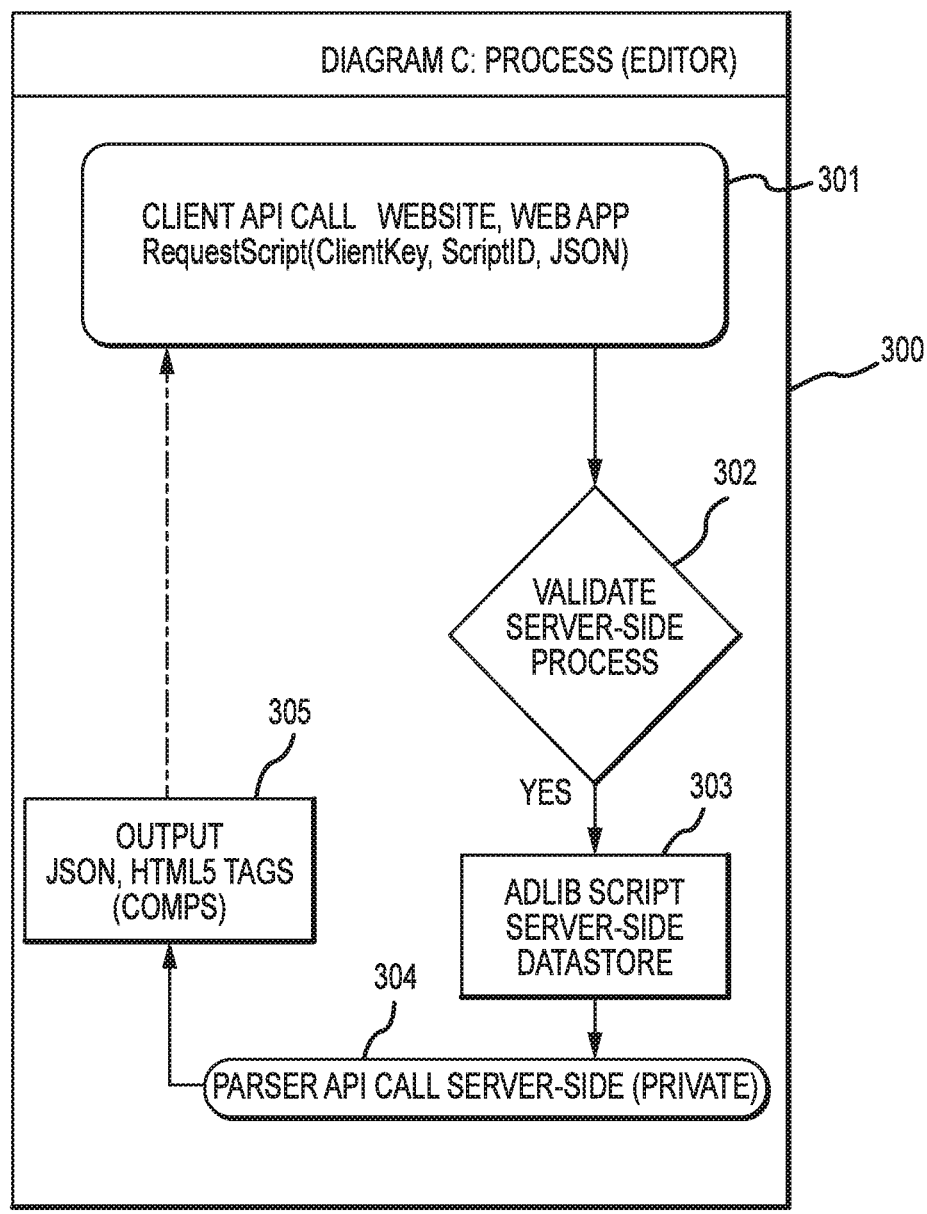
FIG. 3 is an illustration of the process of a content author client requesting dynamically generated content from a server side data store.
Figure 4A:
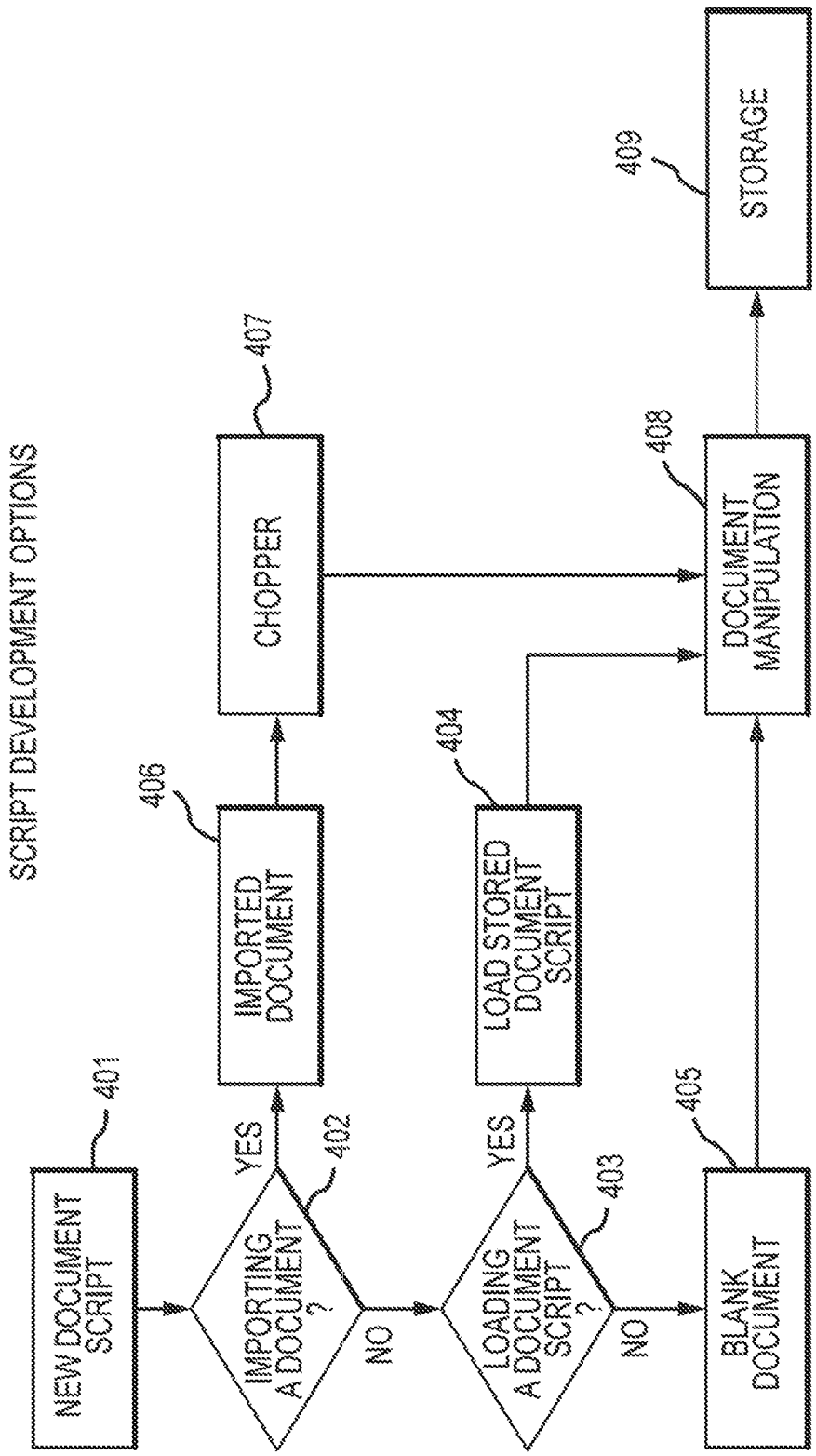
FIG. 4A is a flowchart describing the process of how a content author creates, edits and stores a new document.
Figure 4B:
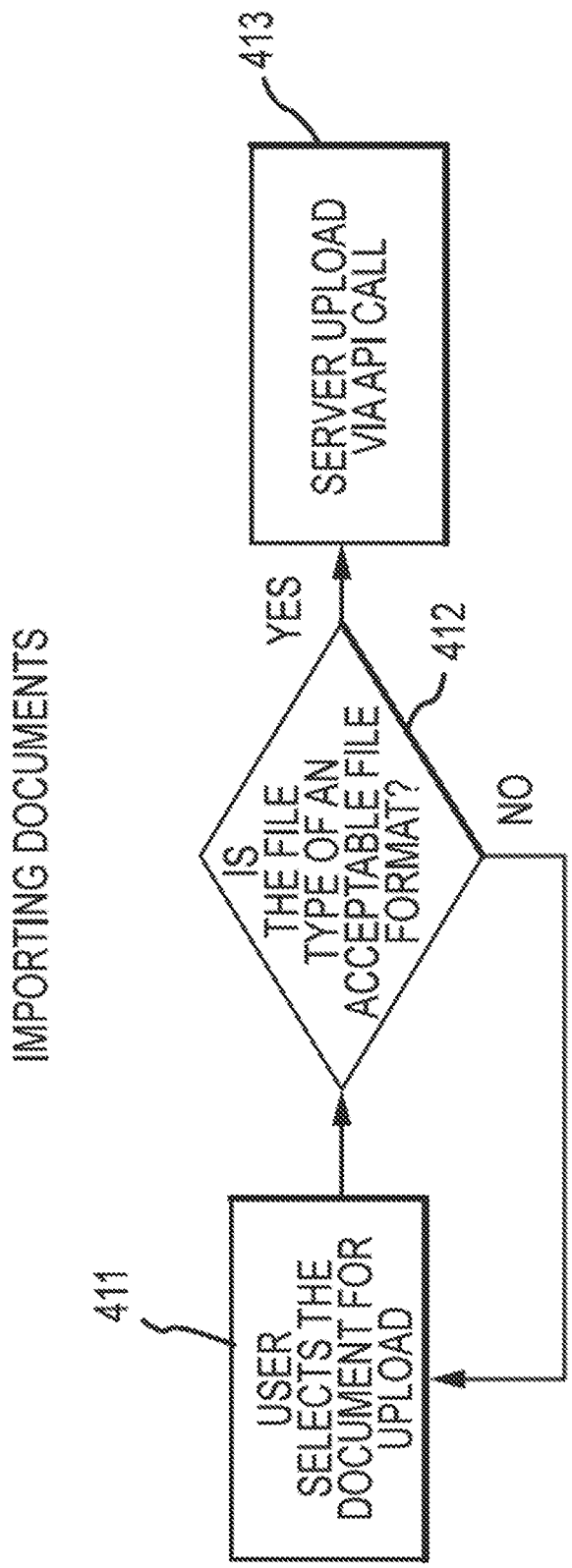
FIG. 4B is a flowchart describing the process of how a content author imports a document.
Figure 4D:
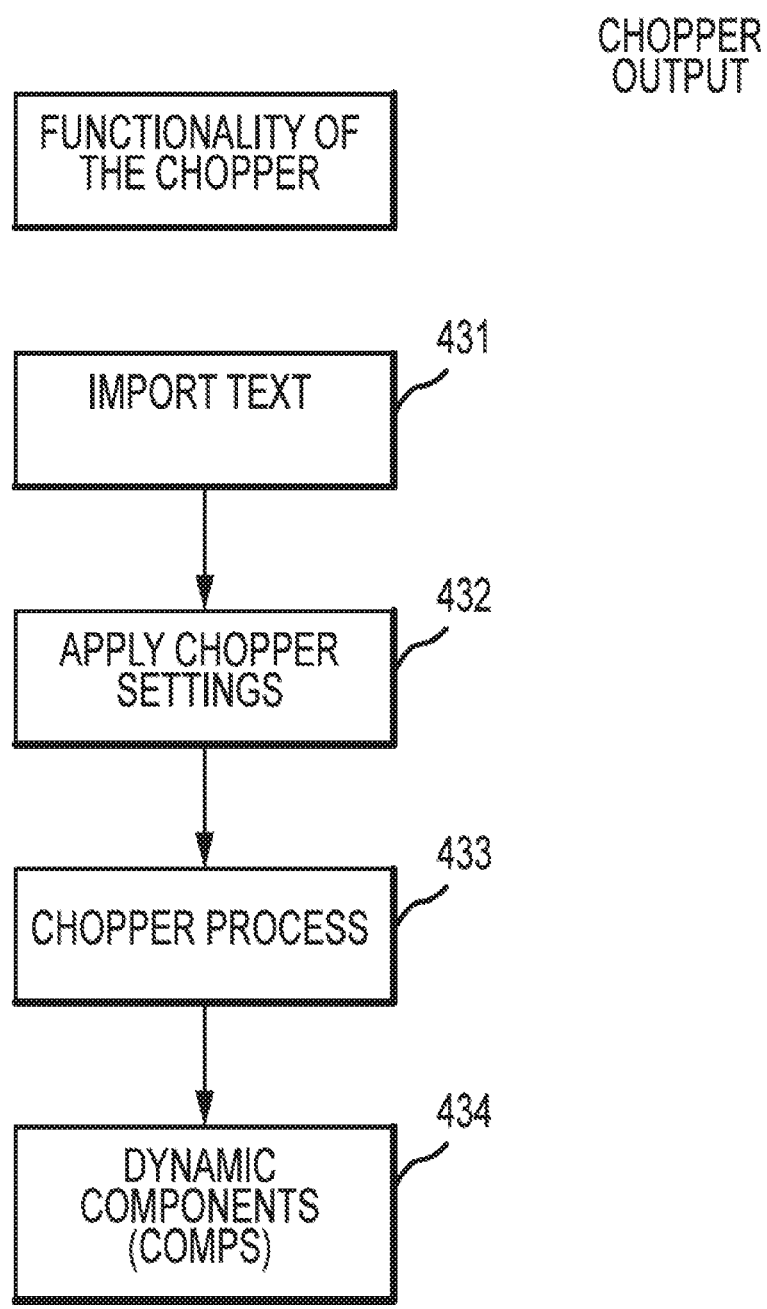
FIG. 4D is a flowchart describing how inputted plain text is converted into structured data.

FIG. 3 illustrates the process by which the system and method permit creation and editing of data content or script data within a database by content author 300. An application residing on a content author's computing device issues a request to edit content 301 using an editor API. A server application receives this request and validates it against the client's public key to confirm a valid client is making the request 302. Script data, content, or both is then accessed from a database, which may be a MySQL relational database management system (RDMS), accessible from the server application via database protocols using a language which may by PHP, and provided to the editor client 303. This output is then returned to the requesting content author application 301. The requesting content author application 301 may use a "widget" program written in a scripting language, for example JavaScript or Perl, for the purpose of providing a user interface for script creation, editing, and maintenance. The server application 302 receiving a request may use a commercially available scripting platform, for example PHP, JSP, ASP, ASP.NET, or Python, for the purpose of processing a request. The requesting content author application 301 may use an application programming interface for the purpose of creating, maintaining, and editing scripts. The content author application 301 and server application 302 may be configured to edit scripts and process requests for content of any type. Alternatively, content author application 301 and server application 302 may be optimized to edit scripts in a single field, for example, scripts used to generate financial reports.

FIGS. 4A, 4B, 4C and 4D are flowcharts describing how a content author creates a script, or adds new elements of script data to a script. The content author first requests that an editor application or widget on a computing device create a new document 401. The content author then chooses whether the new document will be an imported document 402. If the content author chooses not to import a document, she will then choose whether to load a stored document script 403 to serve as a template for the new document. If the content author chooses to load a stored document script, a loading dialog box will appear 404 and the user will select the stored script. If the content author does not choose to load a stored document script, a blank document 405 will be created.

If the content author in step 402 chooses to import a document, then the user application or widget will allow the content author to select a document to be imported 411. The user application or widget will then determine whether the file selected by the content author is of a format that can be parsed by the server-side application 412. If the file cannot be parsed, the import is cancelled. If the file is of a format that can be parsed by the server-side application, the user application or widget will transmit the file to the server-side application using an API call 413. Upon receiving the file, the server-side application will identify the file format used by the file 421. The server-side application will then use a parser application appropriate to the file's format to convert the contents of the file into plain text. Examples of parser applications include applications that can convert Microsoft Word (sold by Microsoft Corp.) files into plain text 422 and applications that can convert Google Docs (made available by Google, Inc.) files into plain text 423.

If a content author imports an external file 406, the content author may then apply a Chopper application 407 to convert plain text into structured data usable by the application. FIG. X3C is a flowchart describing the operation of the Chopper application. A content author may either paste plain text into a user interface 431 or use plain text created by the import process 406. The content author may then select the granularity of the Chopper application conversion of text to data 432. For example, the content author may select conversion of each word, each sentence, each paragraph, or any other such grouping of words or phrases. After the content author makes her selection, the Chopper will divide the plain text into groupings according to the granularity setting chosen 433. For example, if the content author imports a document containing five sentences and chooses a granularity at the sentence level, the Chopper will divide the plain text into five groupings, each containing a single sentence from the imported document. The Chopper then creates 434 one SmartText Comp (defined below) for each text grouping created by the Chopper in step 433. Finally, the Chopper populates each SmartText Comp with plain text based on a text grouping.

Figure 5A:
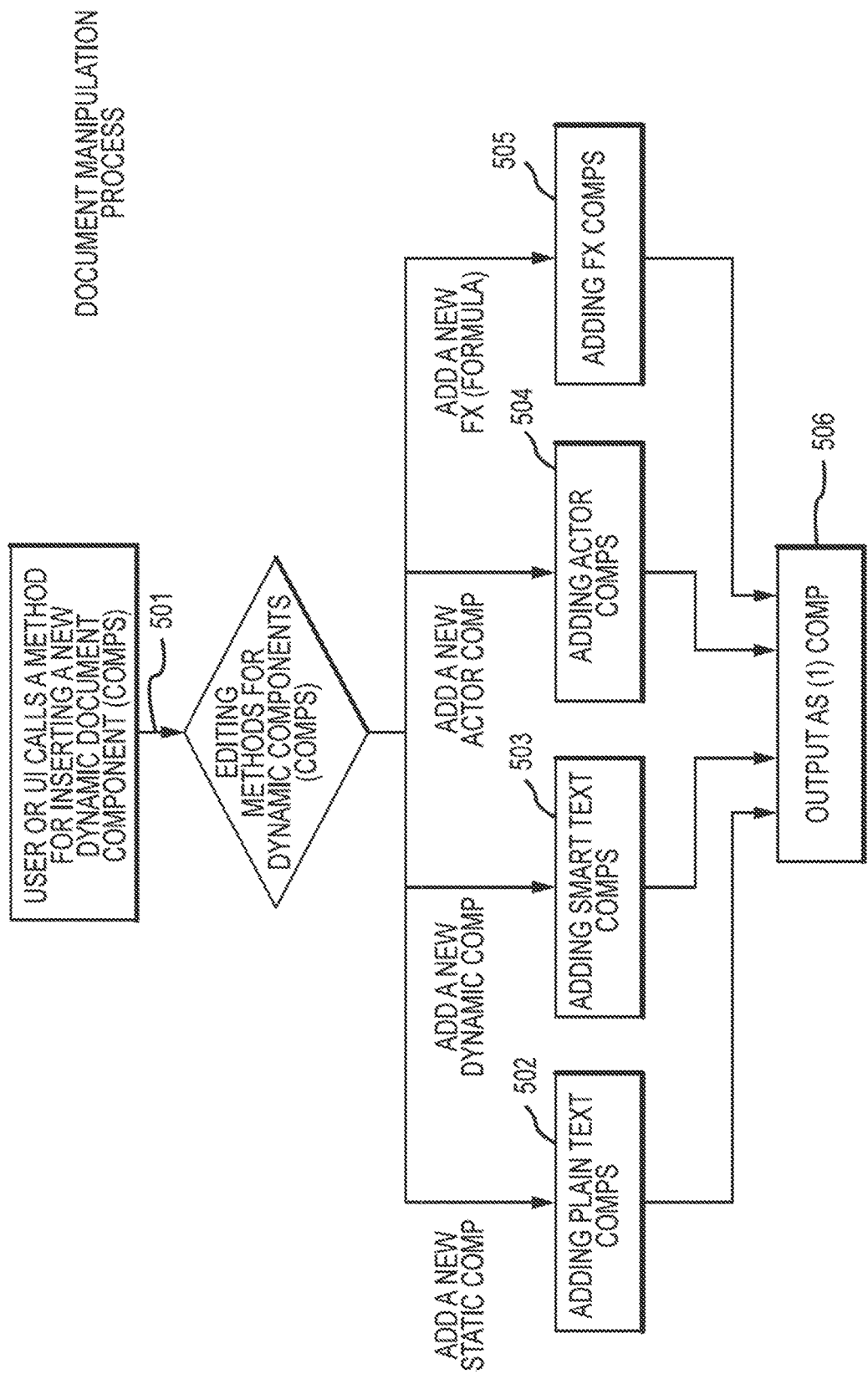
FIG. 5A describes how a content author adds and edits structured data objects.

After importing and using the Chopper 406, loading a stored document script 404, or starting a blank document 405, the content author may create, edit, or delete data objects within that document 408. FIG. 5A describes this document manipulation. A content author, using a user interface within a user application or widget, may send a request to add a new Comp object to a script 501. The user application or widget will then give the user the option to add a Plain Text Comp 502, a SmartText Comp 503, an Actor Comp 504, or an FX Comp 505. The object will be added to the script after the user edits it 506.

Figure 5B:
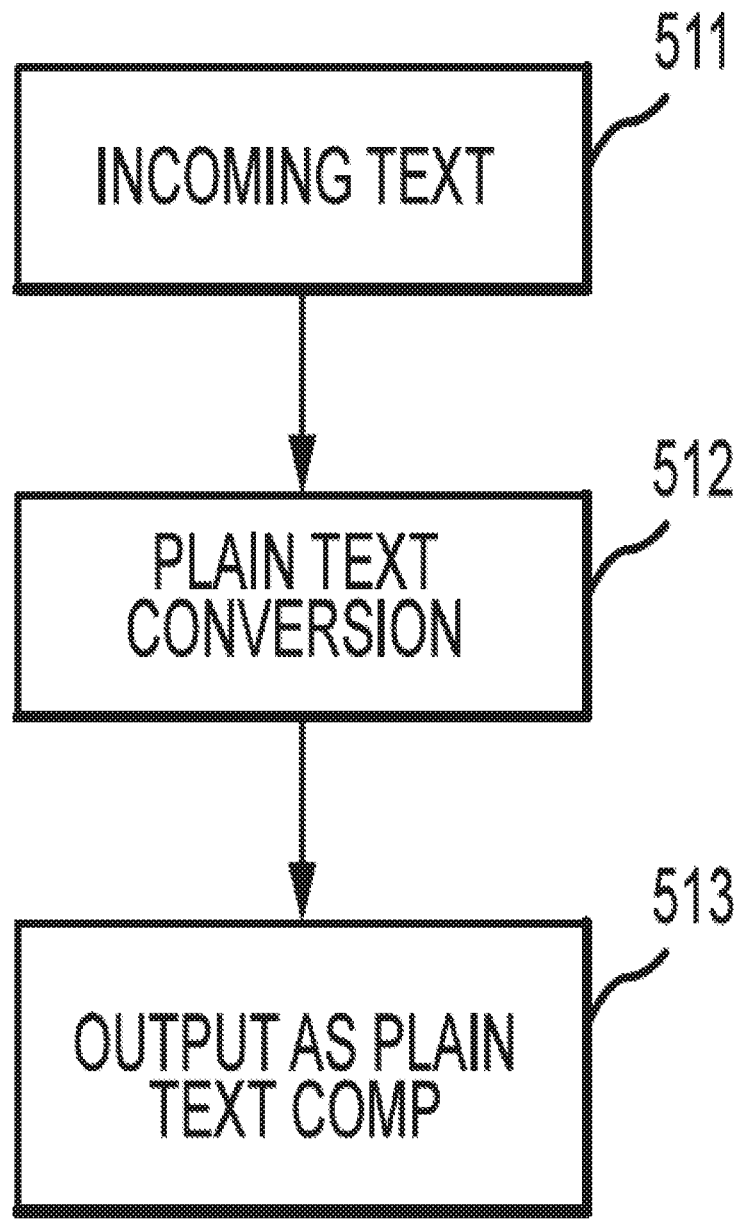
FIG. 5B describes how a content author software application creates Plain Text Comps.

FIG. 5B describes the process of creating a Plain Text Comp. A Plain Text Comp is a data object comprising a text field and a unique identifier. A content author can create a Plain Text Comp by typing or otherwise placing text within a text field on a user interface within a user application or widget 511. After the content author places the text, the application will create a Plain Text Comp object with the inserted text assigned to the "Text" property of the new object 512. The application will also create a unique identifier to identify the object. The application will output the generated Plain Text Comp for addition to the script 513. Plain Text Comps need not be limited to text and can comprise any type of static data. For example, images, video clips, audio clips, any combination of the above, or any other form of static content may be used.

Figure 5C:
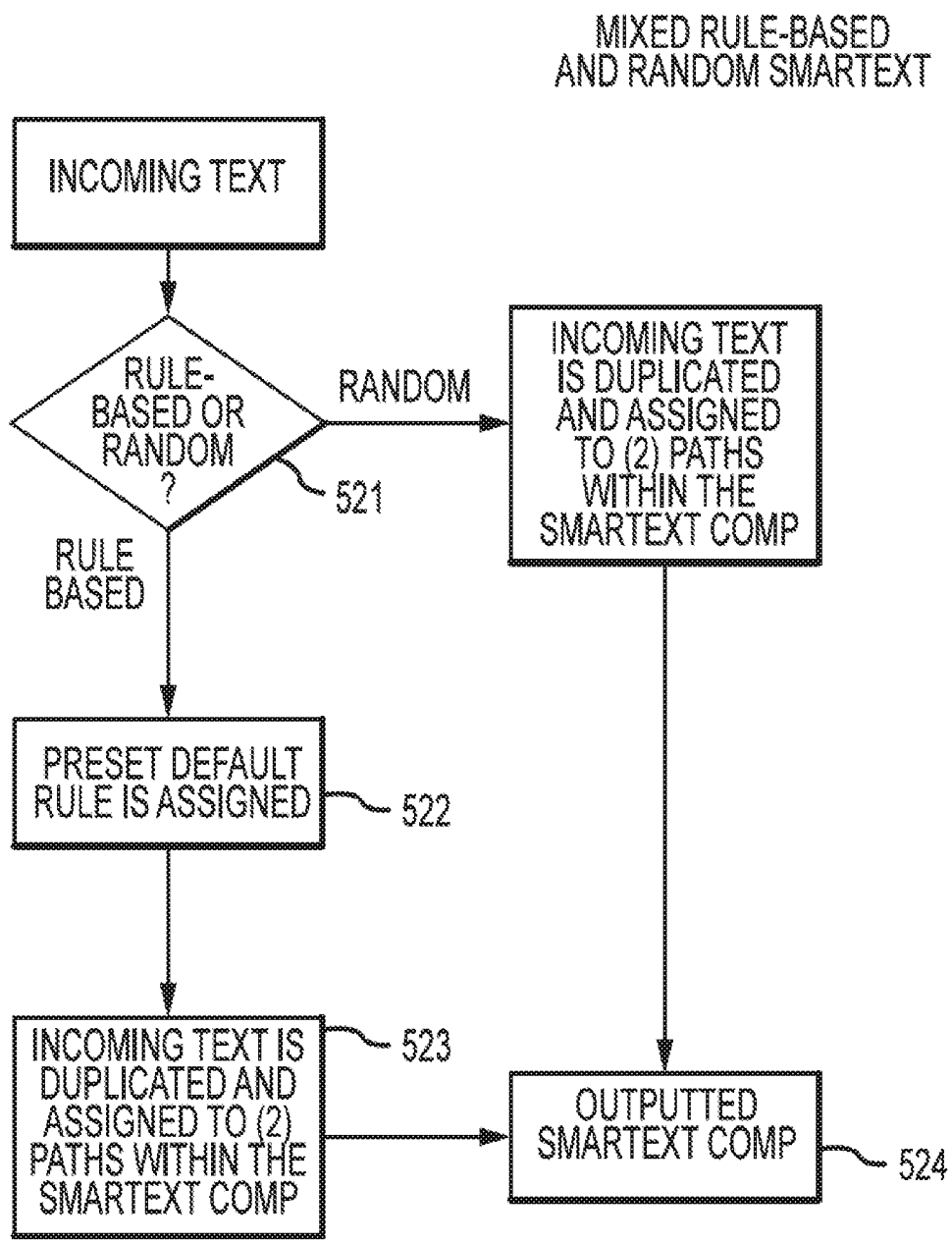
FIG. 5C describes how a content author software application creates Smart Text Comps.

FIG. 5C describes the process of creating a SmartText Comp. A SmartText Comp is a data object comprising "paths," also known as IPXs. "Paths" or "IPXs" comprise a plurality of other Comps or other Paths. "Paths" or "IPXs" may also further comprise one or more logic rules used to determine which of the plurality of Comps or Paths should be selected by the parser. One specialized type of this logic rule is the "Random" rule 521, which instructs the parser to randomly choose a Comp or Path when it executes. Other logic rules 522 will examine data within Comps (for example, by accessing data referenced within an Actor Comp or FX Comp) to determine if the rule is true or false. If all rules are false, a default "Path" defined by the content author 523 will be chosen. The application will output the generated SmartText Comp for addition to the script 524.

Figure 5D:
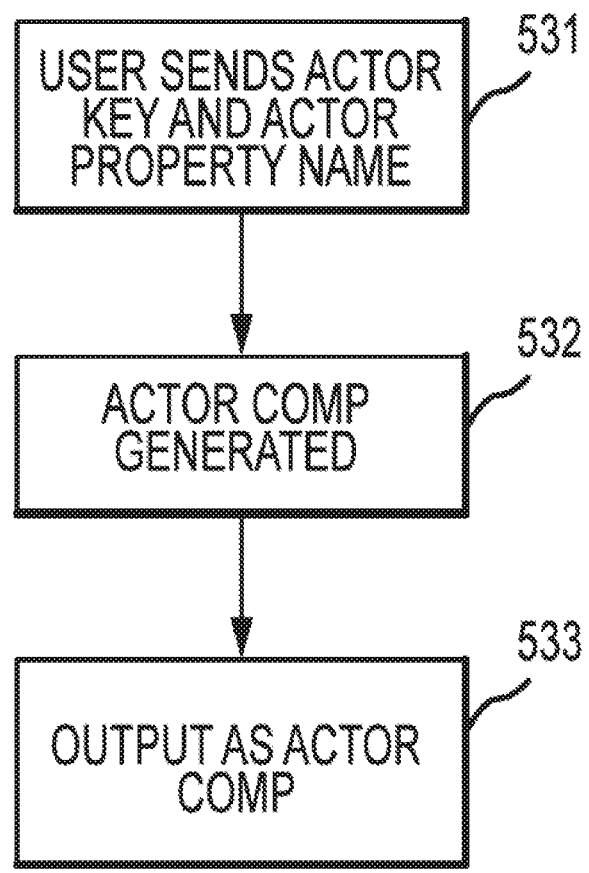
FIG. 5D describes how a content author software application creates Actor Comps.

FIG. 5D describes the process of creating an Actor Comp. An Actor Comp is a data object containing a reference to static data stored within a database. A content author creates an Actor Comp 531 by supplying a Key and Property name to a user interface within a user application or widget. The application or widget will then generate an Actor Comp object containing a reference to the actual data containing the values for the properties 532. This reference is to a location within a database and not a value—even if the content of the referenced data is later changed, the Actor Comp object will continue to reference the same location, and if a lookup is made using the Actor Comp, any application accessing the reference would then see the updated data. The application will output the generated Actor Comp for addition to the script 533. Where the Actor Comp has within it an array of related elements, the Actor Comp may be known as a Parent Actor Comp and related elements in the array known as Child Actors. As noted above, a Group Comp is a container that works with the array of child Actors of the Parent Actor. The Group Comp refers to the Parent Actor Comp, tracks to where the Child Actor array is in the Parent Actor Comp, and then runs one or more of the established Comp objects on the elements of the array. The Group Comp container can hold a plurality of Comps, such as SmartText Comps, Actors Comps, and FX Comps, which can be selectively iterated through once for each element in an array. As an example, a Sale Actor may be provided that describes a particular sale on a variety of items sold. The Sale Actor could have a property called Items, which would hold an unlimited number of Item Actors. The Group Comp allows application of all existing functionality in any Comp (e.g., FXs, calculations, rule-based text, access to other Actors outside of the array) to each element in the array, producing an inner script that can be outputted. In the Sale Actor example, that could include applying dynamic sale prices based on a specified class of customer (such as the level of the customer in a rewards program), and publishing dynamic descriptive text that incorporates some external data as well.

Figure 5E:
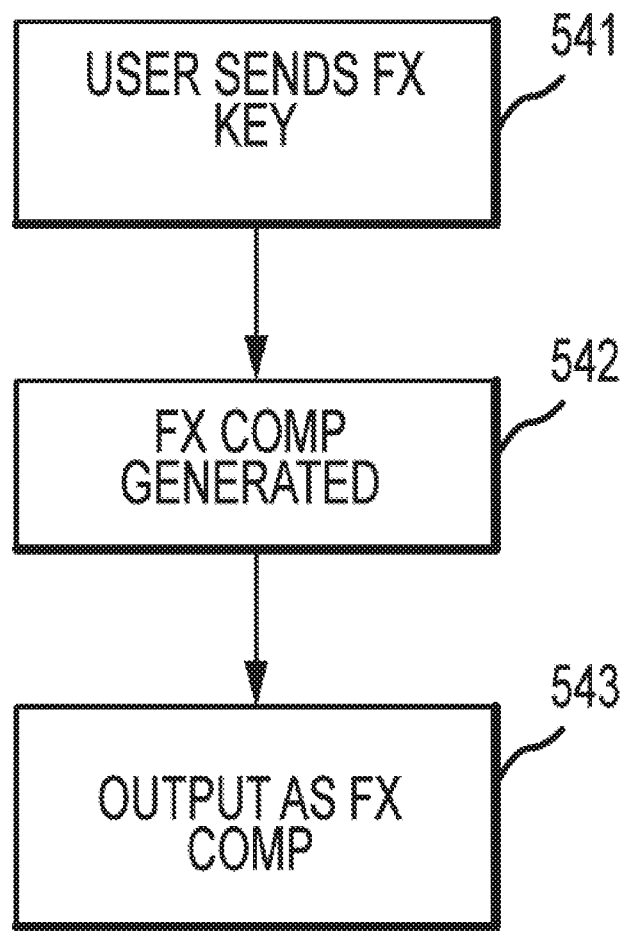
FIG. 5E describes how a content author software application creates FX Comps.

FIG. 5E describes the process of creating an FX Comp. An FX Comp is a data object containing a reference to a function or formula stored within the Global FX Actor 542. This Global FX Actor is a data object, editable by a content author, containing functions or formulas. A content author creates an FX Comp 541 by selecting a key within the Global FX Actor object using a user interface within an editor application or widget. The editor application or widget then creates an FX Comp object 542 containing a reference to the key within the Global FX Actor. The application will output the generated FX Comp for addition to the script 543.

Figure 6:
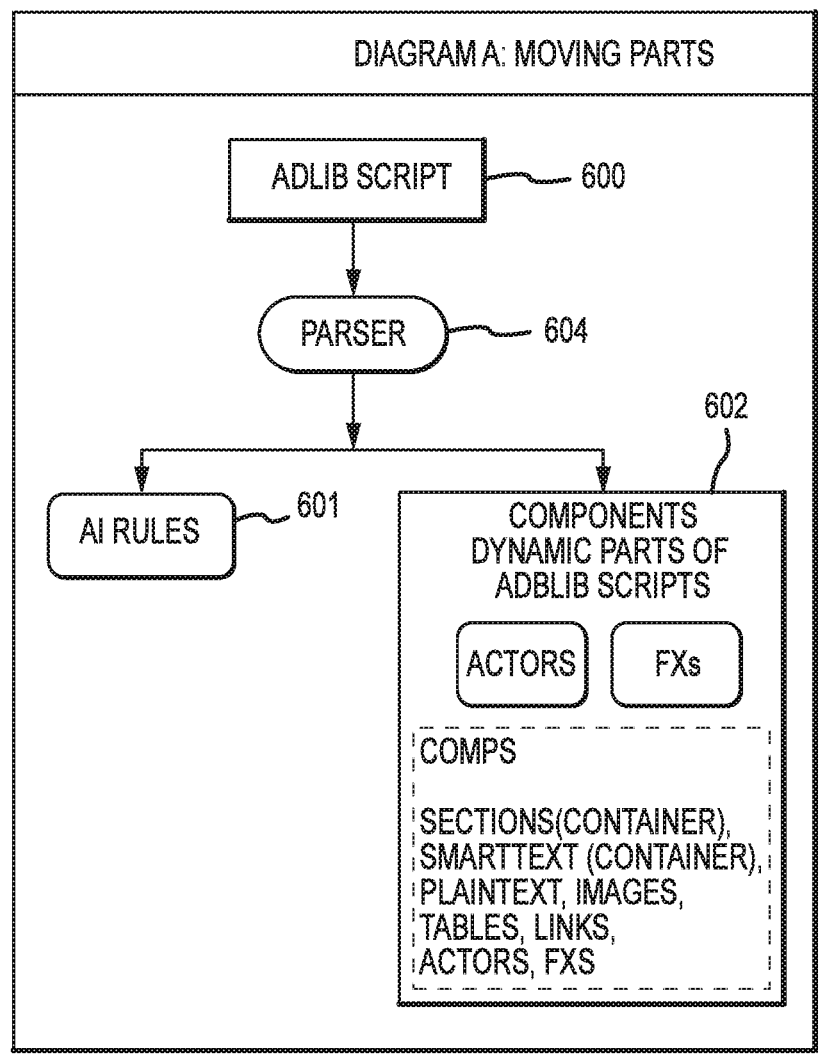
FIG. 6 illustrates a representative implementation of a data object storing the data used by the software application to generate dynamic content.

FIG. 6 is a high-level view of a completed script 600. A script is made up of AI rules 601 and components 602. Comp objects comprise containers that can store other Comp objects 603. When a user requests generated content, a parser application 604 running on a server will apply the AI rules 601 to the data stored in static components 602 to generate static output.

Figure 7A:
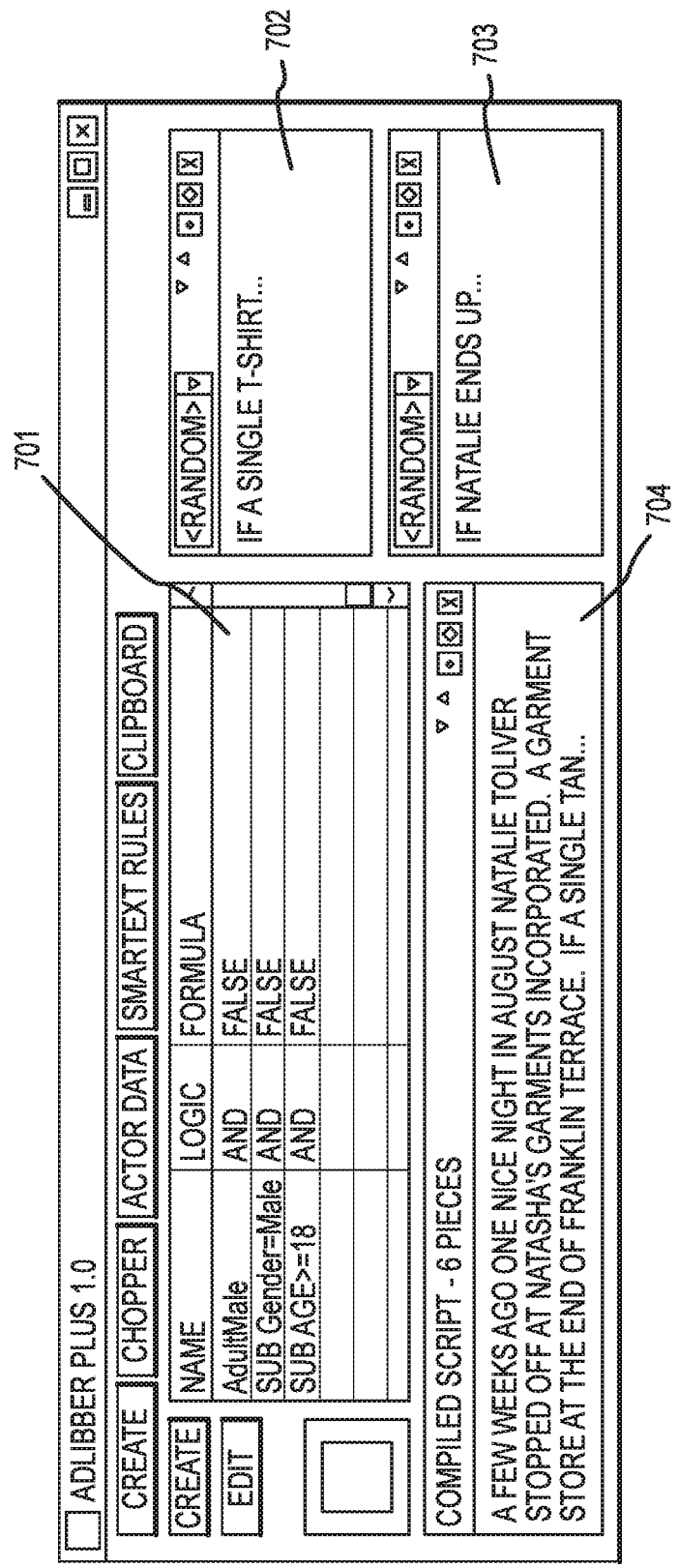
FIG. 7A illustrates an example of a user interface of a software application allowing a content creator to view variations of completed dynamically generated content based on logic rules.
Figure 7B:
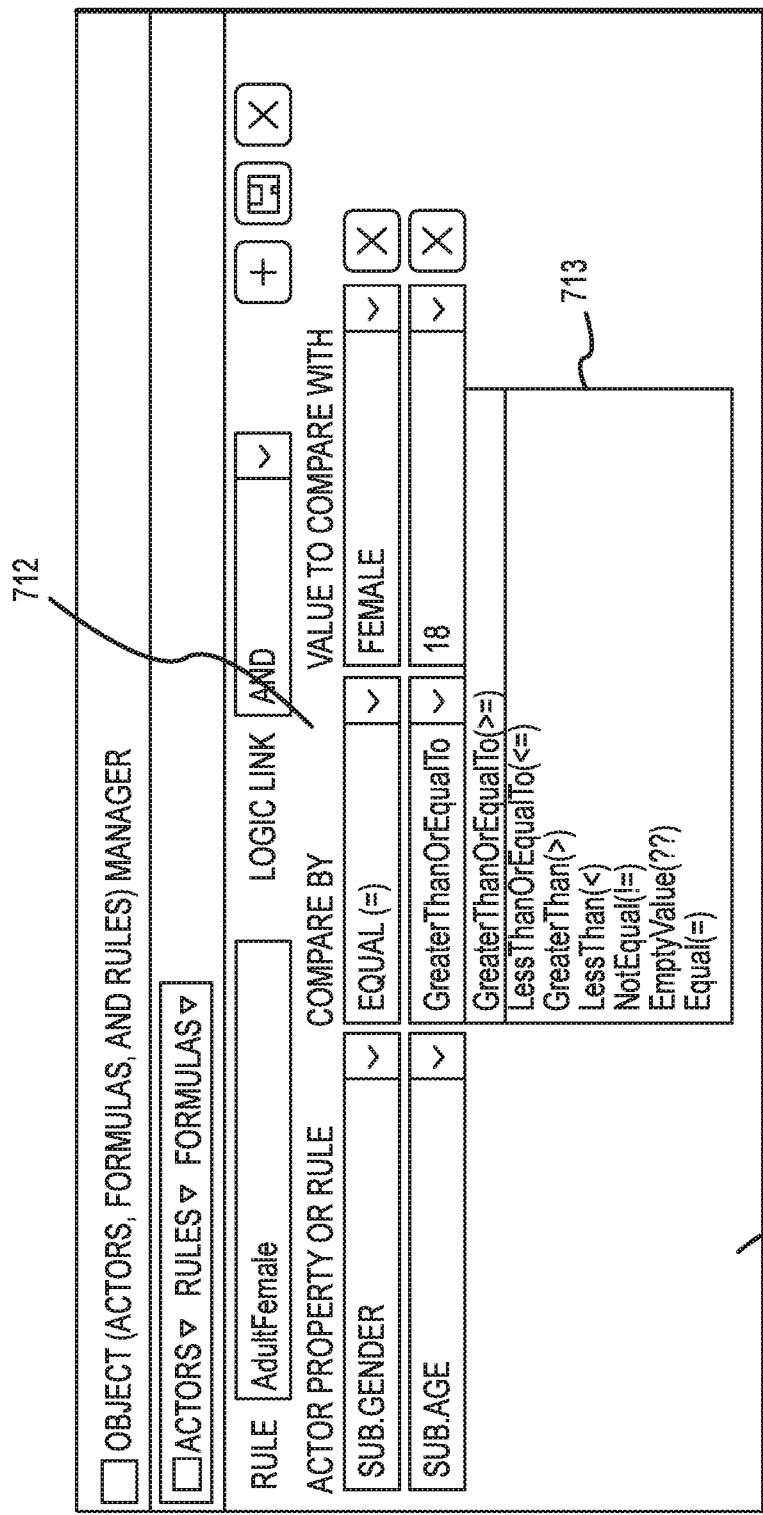
FIG. 7B illustrates an example of a user interface of a software application allowing a content creator to edit logic rules used to generate dynamic content.

As shown in FIG. 7A, content authors may use an application running on the author's computing device to view and manage scripts and Comp data objects 700. The application allows authors to see the complete script result for a given set of rules and data objects 704. As shown in FIG. 7B, content authors may edit logic rules using an application running on the author's computing device 710. Authors may edit rules by selecting either a property of a data object or a logical rule 711, a logical operator 712, and, if a data property 711 is selected, a static value that will be compared to the data property 713. Program 710 may also allow editing of rules, including embedding rules within other rules directly within an editor to allow simplified manipulation of nested rule statements. A user may combine rules by selecting stored rules using the user interface, or by generating a new rule by selecting data properties 711 and logical operators 712. Newly generated rules may thus be combined with rules a content author has previously generated and stored. Rules may be also combined using the user interface via well-known logical operators, such as operators 712 as well as "and," "or," or "xor" statements, to allow an author to determine when a particular combination of rules should execute.

As an example of the script editing described in FIG. 7A, a content author residing in Washington, D.C. may wish to edit a script that produces a form letter to his customers. He may wish to add a sentence at the end of the letter noting the local nature of his business for customers that also reside in Washington. Through the user interface on the user device, he may send a request for a script edit to a server application, which may use PHP or another scripting language to process the request. The server application may return the content author's form letter and scripts to the application on his computer. The author may then use a user interface within said application to input a script (for example: "If Customer.State=='DC' then add 'As a member of the Washington community for 15 years, we are proud to serve our DC-area customers.' to the end of the letter). He may also add a nested rule, for example, "If Customer.State=='DC' AND Customer.Employer=='Army' OR 'Air Force' OR 'Navy' OR 'Marine Corps.' OR 'Coast Guard' then instead add 'As a member of the Washington community for 15 years, we are very proud to support the members of the armed forces in our community.'" He may then instruct the application to save the script. The application may then send a request to a server application, which may use PHP or another scripting language to process the request and store the form letter updated with the new script in a database accessible by the server.

The nested rules may also include predefined or user-generated functions, algebraic formulas or ratios and, these rules, functions, formulas, or ratios may be combined in complex and creative ways. For example, a script may wish to filter and output those baseball players within a dataset that are exceptional. For example, the formula:

MED[FLT[players:(player.AB>=optimal.AB &&
  player.SO<optimal.SO)||
  (player.HR>=exceptional.HR II
  player.RBI>=exceptional.RBI)]: 2*(player.BA/
  player.GT)]

may be used to calculate a baseball statistic for a given player in a dataset comprising baseball statistics, where MED and FLT are Median and Filter functions provided by FXs; AB, SO, HR, RBI, BA, and GT are statistics stored in the player data objects within the dataset; and optimal and exceptional are additional objects including embedded values.

Figure 8:
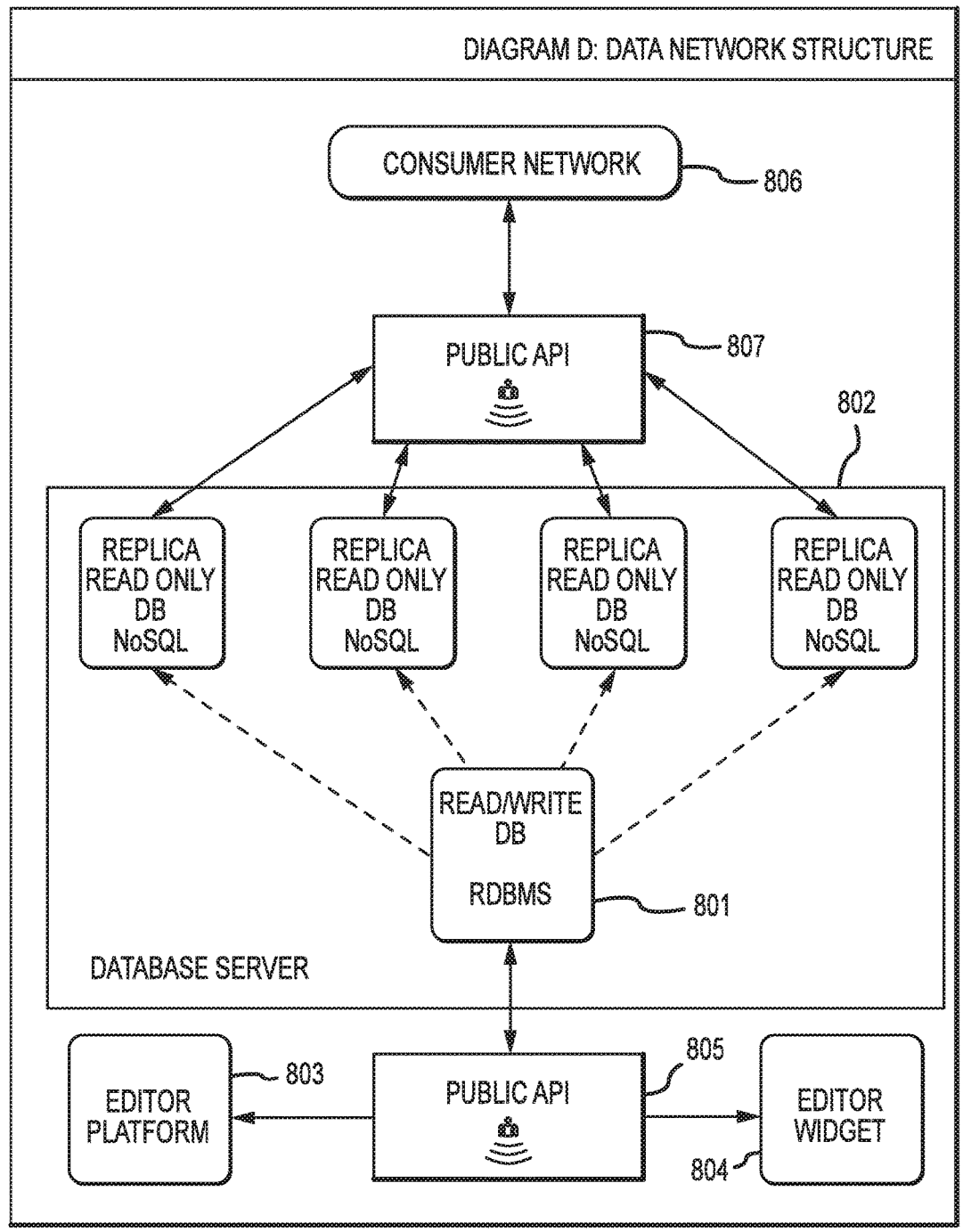
FIG. 8 is an illustration of a data network structure that represents how servers and client applications might be arranged within the system.

FIG. 8 illustrates a representative data network structure 800 for implementing the system and method described. This data network structure comprises one or more computing devices. A database server stores data and scripts in a read/write database 801, which may be a relational database such as a MySQL database. This database may be mirrored by one or more read only databases to allow faster access by client requests 802. These read only databases are nonrelational databases such as NoSQL databases. Content authors may use an editor platform application 803 or an editor widget 804 that can reside on any external website or desktop to edit data within the read/write database. These programs access the database via an editor API 805. End users requesting content use programs running on computers residing on the consumer network 806 to issue any content requests. These content requests rely on a public API to make read-only requests to the database 807.

The system may comprise a computing device (e.g., a laptop, desktop, tablet, smartphone, or other device) operated by a content author, a computing device used as a server, and one or more computing devices operated by users. In this embodiment, all devices reside on the same computer network, such as the Internet. The server computing device provides a read/write database 801 and may provide read only databases 802. Editor programs 803, 804 executed on the content author's computing device implement an editor API 805 and communicate requests to create or edit content or scripts 301 to the server computing device via network requests, such as TCP/IP or other network communications protocol requests. One or more user applications running on one or more user computing devices implement a public API 807 and communicate requests for finished content 201 to the server computing device via network requests, such as TCP/IP or other network communication requests.

Alternatively, a single computing device, such as a stand-alone kiosk not permanently connected to an external network, may be provided that includes the database, parser and validation programs, editor programs, APIs, and user applications, including a user interface for users to request content. A read/write database 801 will and one or more read only databases 802 may exist on the computing device. User applications implementing public API 807 also reside on the computing device, and communicate requests 201 internally to the database programs collocated on the same computing device. Editor programs 803, 804 may reside on the same computing device and communicate requests 301 internally, or editor programs may reside on a separate computing device and communicate requests to create or edit scripts or content 301 via a wired or wireless network connection 805.

As shown in FIG. 9A, content authors have the ability to edit dynamic data via an application running on the author's computer 900. This application allows a content author to delineate data fields and what type of data is stored within each field 901. The application also allows a content author to manually enter data for each field and record 902. For example, a content author who wishes to generate form letters can delineate fields 901 for a recipient's name, address, gender, age, and other factors to each field and record 902.

In addition to manual input, applications running on an author's computer may have the ability to automatically generate data. For example, a content author who wishes to generate form letters may fill out the "gender" field for each data record as "Male" or "Female." The application may then automatically fill in fields such as "himher" with "him" or "her," and "heshe" with "he" or "she" based on data the author manually entered into the "gender" field for each record.

In addition, applications running on an author's computer or a server connected to a database may automatically generate dynamic data by means of calling an external application programming interface that receives data from an external source, such as an external website. For example, the application could receive data from the government National Weather Service website stating the current temperature in each U.S. City. Scripts stored on a server may then process this received data and create new dynamic data values. In the above example, scripts could identify the city entered into each customer record and insert the current temperature for that city in a "Temperature" field. In that example, this automated data input may then allow further dynamic scripting when producing a form letter that may add sentences such as "Hope you are enjoying the heat!" "Stay warm out there!" or "Stay cool out there!" to the letter.

Figure 9B:
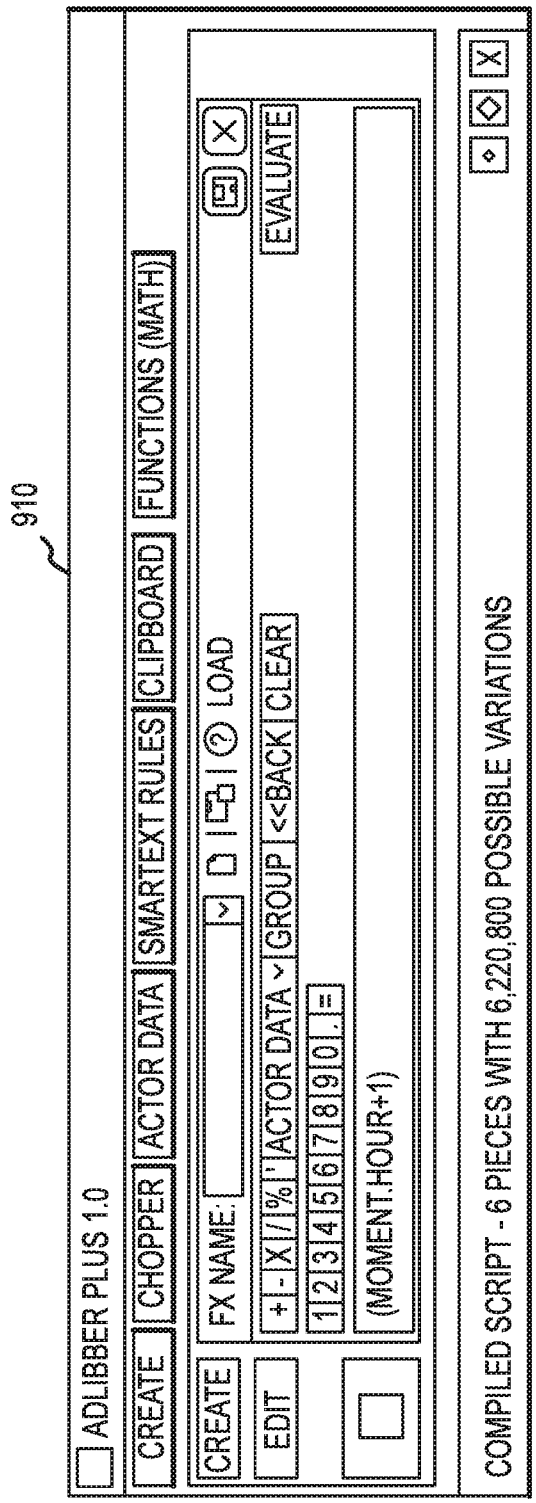
FIG. 9B illustrates an example of a user interface allowing a content creator to view and manipulate mathematical formulas to be used in dynamic data objects.

As shown in FIG. 9B, content authors have the ability to edit formulas and mathematical functions via an application running on the author's computer for the purpose of automatically generating data in a field based on data in other fields in a given data record 910. For example, a content author may develop a formula that calculates data to be stored in an "age" field for each record based on data manually entered into a record's "date of birth" field. As another example, a content author sending form mortgage statements may calculate the payment due for on loan for a given recipient based on the principal and interest rate entered into the recipient's data record.

As shown in FIG. 9C, content authors have the ability to generate the dynamic data that logic rules act on by inputting text into a user interface operating on the author's computer 920. This input is then transmitted to and validated on a server 302. A computer program residing on the server automatically parses the text input and generates dynamic data objects. This automatic parsing generates data objects based on words, sentences, or paragraphs from the static text inputted into the application 921. This generation may create variations for each piece of text parsed by the application for the purpose of varying output by sequentially evaluating each piece of text against rules stored in the database and identifying variations where a rule returns true for a given piece of inputted text. Said variations may be checked for grammatical correctness by integrating commercially available tools and algorithms to test each variation for grammatical errors.

For example, a content author who is a standardized test manufacturer wishing to produce mathematical word problems may wish to vary the text of the word problems to prevent customers from cheating. The content author may input text into a user interface 920. The input is transmitted to and validated on server 302 and then parsed. A server application may use scripts stored a database to check blocks of text against script-based-rules at the word, sentence, and/or paragraph level. As an example, a user could enter the word problem: "Alice Smith had 10 apples and a thief took 2. How many does she have left?" with a setting to parse the sentence by individual words. The parser would then create stub SmartText objects for each individual word inputted (e.g., a SmartText object containing the word "Alice," a SmartText object containing the word "Smith," etc.). These SmartText objects would then be manipulated by the content author. In the above example, the content author may wish to set the SmartText object containing the word "Alice" to randomly replace "Alice" with "Ms." or "Betty" or another name on output. The content author may wish to have rules replacing "8" and "2" with other numerals to customize the word problem (for example, replacing "8" with "12" and "2" with "10"). Additionally, the content author can create a rule in a given SmartText object that calls a thesaurus application and replaces the stored text with the resulting synonym.

The invention claimed is:

1. A computer-implemented method of generating dynamic content comprising:
   generating at least one dynamic script incorporating a set of rules;
   storing the at least one dynamic script in at least one database;
   storing at least one data object within the at least one database that are accessed in generating the at least one dynamic script, wherein the at least one data object contains nested rules that reference at least one of dynamic scripts, mathematical functions, or formulas;
   providing an application programming interface, wherein the application programming interface provides read-write access to the at least one database;
   editing the at least one dynamic script in the database, wherein the editing is performed by an editor program implementing the application programming interface;
   receiving at least one request from a user to generate content;
   accessing dynamic data, wherein the dynamic data includes a component that contains inner path rules used to determine which data is selected for output in the dynamic script; and
   providing a parser application that automatically parses the received requests to generate dynamic data objects and generates output in response to the at least one request based at least in part on the dynamic script, by applying the dynamic script to the at least one data object stored in the database and the generated dynamic data objects according to the inner paths that determine which paths and data objects within the database should be selected by the parser.

2. The method of claim 1, wherein at least one first dynamic script stored within the database references at least one second dynamic script stored within the database.

3. The method of claim 1, wherein the editor program generates at least one new data object and wherein the data object is stored within the at least one database.

4. The method of claim 3, wherein the generation of a new data object relies on data from an external data source.

5. The method of claim 1, wherein the editor program generates at least one new data object using text inputted from a user and wherein the data object is stored within the at least one database.

6. The method of claim 5, wherein the generation utilizes random variations for each word, sentence, paragraph, or other grouping of text inputted.

7. The method of claim 1, wherein the system provides a user with a series of questions upon making a content request; and wherein the output is based at least in part on parsing at least one dynamic script based on received answers to the questions.

8. The method of claim 7, wherein the output contains additional questions, and wherein a second output is generated based at least on part on parsing at least one dynamic script based on received answers to the additional questions.

9. The computer-implemented method of claim 1, further comprising a chopper application configured to converted plain text external files into structure data.

10. A system for generating dynamic content, comprising:
    a processor configured to implement instructions stored on a non-transitory computer readable medium; and
    at least one database stored on a non-transitory computer-readable medium, wherein the processor is in communication with the at least one database;
    at least one data object stored within the at least one database, wherein the at least one data object contains nested rules that reference at least one of dynamic scripts, mathematical functions, or formulas;
    wherein the processor configured to:
       generate at least one dynamic script, the generation including referencing the at least one data object;
       store the at least one dynamic script in the at least one database;
       provide an application programming interface, wherein the application programming interface provides read-write access to the at least one database;
       edit the at least one dynamic script in the database, wherein the editing is performed by an editor program implementing the application programming interface;
       receive at least one request from a user to generate content;
       access dynamic data, wherein the dynamic data includes a component that contains inner path rules used to determine which data is selected for output in the dynamic script; and
       provide a parser application that automatically parses the received requests to generate dynamic data objects and generates output in response to the at least one request based at least in part on the dynamic script, by applying the dynamic script to the at least one data object stored in the database and the generated dynamic data objects according to the inner paths that determine which paths and data objects within the database should be selected by the parser.

11. The system of claim 10, wherein at least one first dynamic script stored within the database references at least one second dynamic script stored within the database.

12. The system of claim 10, wherein the editor program generates at least one new data object and wherein the data object is stored within the at least one database.

13. The system of claim 12, wherein the generation of a new data object relies on data from an external data source.

14. The system of claim 10, wherein the editor program generates at least one new data object using text inputted from a user and wherein the data object is stored within the at least one database.

15. The system of claim 14, wherein the generation utilizes random variations for each word, sentence, paragraph, or other grouping of text inputted.

16. The system of claim 10, wherein the system provides a user with a series of questions upon making a content request; and wherein the output is based at least in part on parsing at least one dynamic script based on received answers to the questions.

17. The system of claim 16, wherein the output contains additional questions, and wherein a second output is generated based at least on part on parsing at least one dynamic script based on received answers to the additional questions.

18. A computer readable medium, comprising instructions which, when executed, cause a computer system to:
    generate at least one dynamic script;
    store the at least one dynamic script in at least one database;
    store at least one data object within the at least one database that are accessed in generating the at least one dynamic script, wherein the at least one data object contains nested rules that reference at least one of dynamic scripts, mathematical functions, or formulas;

provide an application programming interface, wherein the application programming interface provides read-write access to the at least one database;

edit the at least one dynamic script in the database, wherein the editing is performed by an editor program implementing the application programming interface;

receive at least one request from a user to generate content;

access dynamic data, wherein the dynamic data includes a component that contains inner path rules used to determine which data is selected for output in the dynamic script; and provide a parser application that automatically parses the received requests to generate dynamic data objects and generates output in response to the at least one request based at least in part on the dynamic script, by applying the dynamic script to the at least one data object stored in the database and the generated dynamic data objects according to the inner paths that determine which paths and data objects within the database should be selected by the parser.

* * * * *